(12) United States Patent
Friedli

(10) Patent No.: US 8,888,153 B2
(45) Date of Patent: Nov. 18, 2014

(54) POST HOLE DIGGER

(71) Applicant: Zachary J. Friedli, Perry, UT (US)

(72) Inventor: Zachary J. Friedli, Perry, UT (US)

( * ) Notice: Subject to any disclaimer, the term of this patent is extended or adjusted under 35 U.S.C. 154(b) by 0 days.

(21) Appl. No.: 13/970,479

(22) Filed: Aug. 19, 2013

(65) Prior Publication Data

US 2014/0054908 A1    Feb. 27, 2014

Related U.S. Application Data

(63) Continuation of application No. 13/430,479, filed on Mar. 26, 2012, now Pat. No. 8,511,729.

(60) Provisional application No. 61/467,846, filed on Mar. 25, 2011.

(51) Int. Cl.
  *A01D 11/00*   (2006.01)
  *B25G 1/04*    (2006.01)
  *A01B 1/18*    (2006.01)

(52) U.S. Cl.
  CPC .... *A01B 1/18* (2013.01); *B25G 1/04* (2013.01)
  USPC ............................................. 294/50.8; 294/57

(58) Field of Classification Search
  CPC ............ A01B 1/16; A01B 1/165; A01B 1/18;
        A01B 1/02; A01B 1/022; A01D 7/10; A01C
              5/02; E21B 11/005; B25G 1/04
  USPC ................. 294/50, 50.8, 50.5, 49, 57, 59, 1.4
  See application file for complete search history.

(56) References Cited

U.S. PATENT DOCUMENTS

| | | |
|---|---|---|
| 263,038 A | 8/1882 | Fleming |
| 456,655 A | 7/1891 | Kohler |
| 654,909 A | 7/1900 | Monroe |
| 1,007,512 A | 10/1911 | Aardahl |
| 1,121,615 A | 12/1914 | Day |
| 1,187,316 A | 6/1916 | Higby |
| 1,360,120 A | 11/1920 | Lambert |
| 1,548,865 A | 8/1925 | Bull |
| 1,553,270 A | 9/1925 | Saffold |
| 1,888,929 A | 11/1932 | McDowell et al. |
| 2,371,563 A | 3/1945 | Walter |
| 2,435,473 A | 2/1948 | Sonnenberg |
| 2,712,467 A | 7/1955 | Rice |

(Continued)

FOREIGN PATENT DOCUMENTS

GB    2069914 A    9/1981

*Primary Examiner* — Saul Rodriguez
*Assistant Examiner* — Gabriela Puig
(74) *Attorney, Agent, or Firm* — Kunzler Law Group, PC

(57) ABSTRACT

According to one embodiment, an apparatus includes a pair of shaft portions each comprising a handle slidably coupled to a base. Each handle includes a first impact surface and each base includes a second impact surface. The handles are slidable relative to the bases such that the first impact surfaces of the handles impact the second impact surfaces of respective bases. The apparatus also includes a pair of blades each coupled to the base of a respective one of the shaft portions to form respective halves of the apparatus. Further, the apparatus includes a pivot connection that pivotally couples the halves together at a location between the bases and blades of the respective halves such that movement of the handles away from each other moves the blades toward each other, and movement of the handles toward each other moves the blades away from each other.

4 Claims, 6 Drawing Sheets

(56) References Cited

U.S. PATENT DOCUMENTS

| | | |
|---|---|---|
| 2,811,333 A | 10/1957 | Bishop |
| 4,466,188 A | 8/1984 | Svendsgaard |
| 5,669,648 A | 9/1997 | Luck |
| 5,768,785 A | 6/1998 | Pessin |
| 5,865,490 A | 2/1999 | Vowell |
| 6,068,315 A | 5/2000 | Vaughter |
| 6,123,374 A | 9/2000 | Elder |
| 6,213,672 B1 | 4/2001 | Varga |
| 7,784,842 B1 | 8/2010 | Wright |
| 7,980,781 B2 * | 7/2011 | Trice .............................. 403/349 |
| 8,511,729 B2 * | 8/2013 | Friedli ........................ 294/50.8 |
| 2006/0066117 A9 | 3/2006 | Swartz |

* cited by examiner

POST HOLE DIGGER

CROSS-REFERENCE TO RELATED APPLICATION

This application is a continuation of U.S. patent application Ser. No. 13/430,479, filed on Mar. 26, 2012, which claims the benefit of U.S. Provisional Patent Application No. 61/467,846, filed Mar. 25, 2011, which are incorporated herein by reference.

FIELD

This application is related generally to hand tools, and more particularly to manually-operated hand tools, such as post hole diggers.

BACKGROUND

Post hole diggers are tools used to dig holes for fence post, sign posts, and other structures that require a narrow hole. The traditional post hole digger is formed of two elongated handles connected to digging blades. A pivoting fastener joins the digging blades and allows a person to operate the blades in a clamshell-like fashion by opening and closing the handles. A person drives the digging blades into the ground by raising the post hole digger above the spot of the desired hole, repeatedly thrusting the post hole digger into the ground, closing the clamshell-like digging blades, and removing the portion of ground caught between the blades.

However, often times the person finds it difficult to strike the ground in the same spot until the hole is deep enough to guide subsequent thrusts of the post hole digger. Further, repeatedly lifting and thrusting the entire post hole digger is physically demanding and time-consuming. Therefore, effort and accuracy is wasted when using conventional post hole diggers to form a post hole.

SUMMARY

The subject matter of the present application has been developed in response to the present state of the art, and in particular, in response to the problems and needs in the art that have not yet been fully solved by currently available manually-operated tools. Accordingly, the subject matter of the present application has been developed to provide various embodiments of an apparatus, system, and method for digging post holes that provide one or more advantages over the prior art tools.

According to one embodiment, an apparatus includes a pair of shaft portions each comprising a handle slidably coupled to a base. Each handle includes a first impact surface and each base includes a second impact surface. The handles are slidable relative to the bases such that the first impact surfaces of the handles impact the second impact surfaces of respective bases. The apparatus also includes a pair of blades each coupled to the base of a respective one of the shaft portions to form respective halves of the apparatus. Further, the apparatus includes a pivot connection that pivotally couples the halves together at a location between the bases and blades of the respective halves such that movement of the handles away from each other moves the blades toward each other, and movement of the handles toward each other moves the blades away from each other.

In one implementation, each base defines an interior channel within which a respective handle is slidable. In another implementation, each handle defines an interior channel within which a respective base is slidable.

According to some implementations, each base includes a slot and each handle includes a pin engageable with the slot of a respective base. The slot includes a substantially U-shaped portion, J-shaped portion, and/or L-shaped portion in certain implementations. In some implementations, each base further includes an aperture that is separate from the slot. The pin of each handle can be engageable with the aperture of a respective base. The pin of each handle can be retractable to switch between engagement with the slot and aperture of a respective base.

In certain implementations, each handle includes a weight that is proximate the first impact surface. Each blade of the apparatus can be a post hole digger blade.

According to another embodiment, a post hole digger includes a first half and second half. The first half includes a first elongate handle that is slidably coupled to a first elongate base. The first elongate handle is slidable in a downward direction relative to the first elongate base to impact a first portion of the first elongate base and impart a downwardly directed force to the first elongate base. The first half further includes a first curved blade fixedly coupled to the first elongate base. The second half includes a second elongate handle that is slidably coupled to a second elongate base. The second elongate handle is slidable in a downward direction relative to the second elongate base to impact a second portion of the second elongate base and impart a downwardly directed force to the second elongate base. The second half further includes a second curved blade that is fixedly coupled to the second elongate base.

a pivot connection pivotally coupling the first and second halves together, wherein movement of the first and second elongate handles away from each other corresponds with movement of the first and second blades toward each other, and movement of the first and second elongate handles toward each other corresponds with movement of the first and second blades away from each other.

In some implementations of the post hole digger, the first elongate handle is independently movable relative to the second elongate handle.

According to some implementations of the post hole digger, the first and second elongate bases each comprises a cylindrical hollow tube, and the first and second handles each comprises a cylindrical tube insertable into and slidably movable within the first cylindrical hollow tube of the respective one of the first and second elongate bases. The first and second elongate bases can each include a longitudinally extending slot. The first and second handles can each include a pin that is extendable through the longitudinally extending slot of the respective one of the first and second bases. Engagement between the pins and longitudinally extending slots can prevent rotational movement between the first and second handles and the first and second bases, respectively.

In certain implementations, the first and second elongate bases each includes a laterally extending slot that is contiguous with the longitudinally extending slot. The pin can be extendable through the laterally extending slot of the respective one of the first and second bases. Engagement between the pins and laterally extending slots allows rotational movement between the first and second handles and the first and second bases, respectively. The longitudinally extending slot may be a long longitudinally extending slot. Further, the first and second elongate bases each includes a short longitudinally extending slot that is coupled to the long longitudinally extending slot via the laterally extending slot. The pin is extendable through the short longitudinally extending slot of the respective one of the first and second bases. Engagement between the pins and short longitudinally extending slots prevents rotational movement between the first and second handles and the first and second bases, respectively. The first and second handles can be actuatable relative to the respective first and second bases to seamlessly transition the position of the pins between the long longitudinally extending slots, laterally extending slots, and short longitudinally extending slots.

According to some implementations, the first and second elongate bases each comprises an aperture adjacent the longitudinally extending slot. The pin can be retractable to disengage from the longitudinally extending slot and extendable to extend through the aperture of the respective one of the first and second bases. Engagement between the pins and apertures prevents slidable and rotational movement between the first and second handles and the first and second bases, respectively.

In one implementation, the first and second portions of the first and second elongate bases include respective striking plates adjacent the pivot connection. The first and second elongate handles each include a weight that is impactable with the striking plate of a respective one of the first and second elongate bases.

According to yet another embodiment, a method for forming a post hole in the ground includes positioning a post hole digger over a post installation site on the ground. The post hole digger includes a pair of shaft portions each including a handle that is slidably coupled to a base. The post hole digger further includes a pair of blades each coupled to the base of a respective one of the shaft portions. The method also includes independently sliding the handles along the bases from a raised position downwardly toward the ground into a lowered position to impact an impact plate of the post hole digger in force transmitting communication with the blades to drive the blades into the ground. Also, the method includes independently sliding the handles along the bases upwardly from the lowered position into the raised position.

The method additionally includes repeating as necessary the actions of sliding the handles along the bases from the raised position downwardly toward the ground into the lowered position and sliding the handles along the bases upwardly from the lowered position into the raised position until the blades are driven into the ground to a desired depth. With the blades at the desired depth in the ground, the method includes moving the shaft portions apart to bring the blades together about a portion of ground between the blades. Further, with the blades at the desired depth in the ground, the method includes rotating the handles relative to the respective bases to temporarily lock the handles in place relative to the bases. With the handles temporarily locked in place, the method includes raising the post hole digger with the shaft portions moved apart and the portion of ground between the blades. Additionally, the method includes moving the shaft portions together to release the portion of ground between the blades at a location away from the post installation site.

In some implementations of the method, independently sliding the handles along the bases from the raised position downwardly toward the ground into the lowered position and independently sliding the handles along the bases upwardly from the lowered position into the raised position includes guiding respective pins of the handles along respective alignment slots formed in the bases. Further, rotating the handles relative to the respective bases to temporarily lock the handles in place may include guiding the respective pins of the handles along respective U-shaped portions of the alignment slots.

According to certain implementations, the method includes retracting the pins out of the alignment slots, rotating the handles relative to the bases, and extending the pins into engagement with respective apertures formed in the bases to more permanently lock the handles in place.

In another embodiment, a hand tool includes a base that has a first impact surface and a slot. The slot has a substantially U-shaped portion and/or L-shaped portion. The hand tool also includes a handle that is slidably coupled to the base. The handle includes a second impact surface and is slidable relative to the base such that the second impact surface of the handle impacts the first impact surface of the base. The handle also includes a pin that is engageable with the slot of the base, where the pin is movably retained by the slot as the handle slides relative to the base. The hand tool also includes a tool attachment coupled to the base.

Reference throughout this specification to features, advantages, or similar language does not imply that all of the features and advantages that may be realized with the subject matter of the present disclosure should be or are in any single embodiment or implementation of the subject matter. Rather, language referring to the features and advantages is understood to mean that a specific feature, advantage, or characteristic described in connection with an embodiment is included in at least one embodiment of the subject matter of the present disclosure. Discussion of the features and advantages, and similar language, throughout this specification may, but do not necessarily, refer to the same embodiment or implementation.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Figure 1:
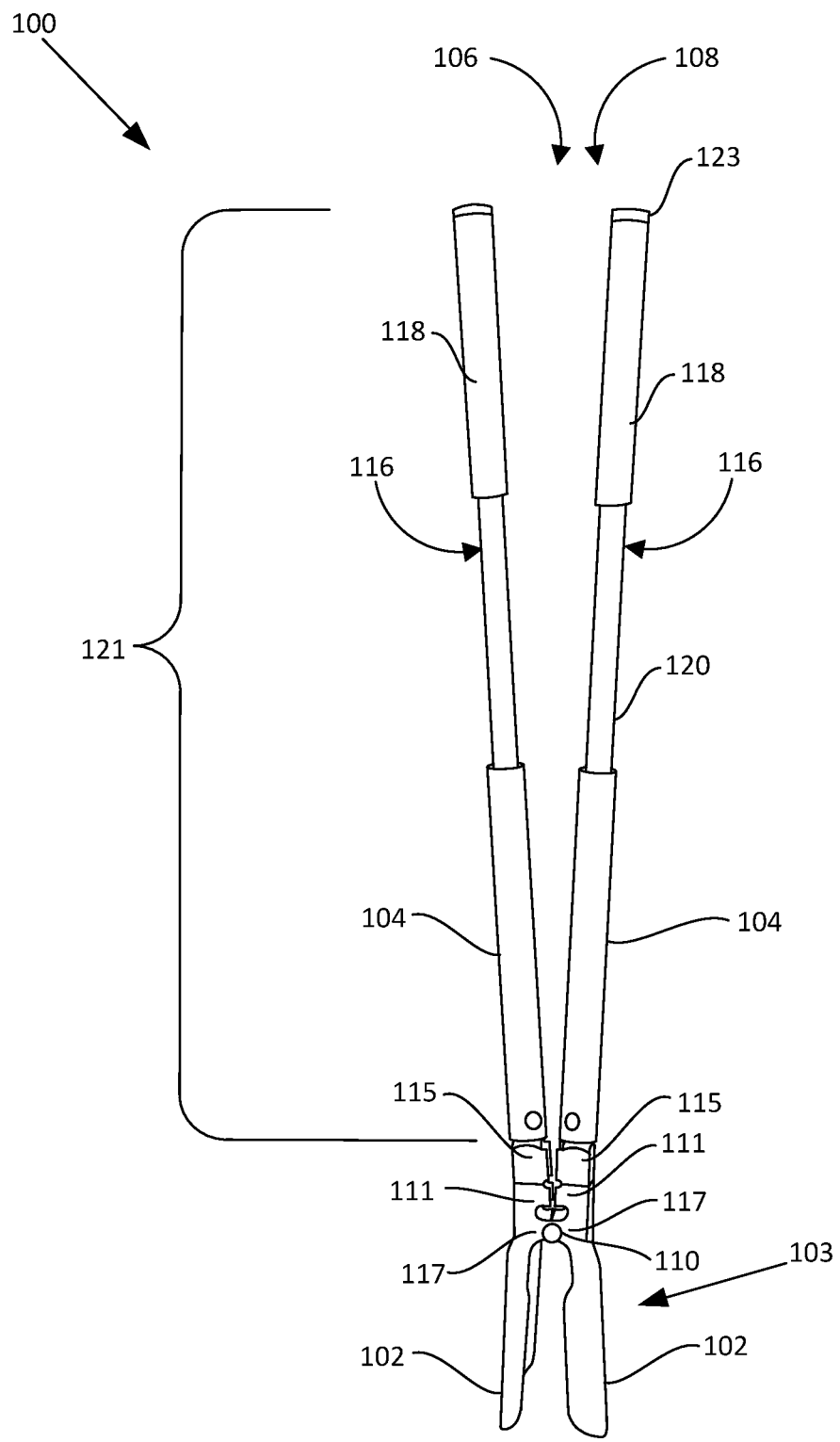
FIG. 1 is a front view of a post hole digger in an open configuration according to one embodiment.

FIG. 1 is a side view diagram illustrating one embodiment of a post hole digger 100 in an open configuration (e.g., with the blades 102 open). The post hole digger 100 includes a pair blades 102 coupled to a respective one of a pair of shaft portions 121 via a pivot connection 103. Each blade 102 and respective shaft portion 121 collectively defines one of a first and second portion or half 106, 108 of the post hole digger 100. The first and second portions 106, 108 of the digger 100 are pivotally connected to each other by the pivot connection 103. Generally, the pivot connection 103 facilitates movement of the blades 102 apart from each other (e.g., open) as the shaft portions 121 are moved toward each other, and movement of the blades toward each other (e.g. close) as the shaft portions are moved away from each other. As will be described in more detail below, once the driven to a desired depth in the ground, the closing and opening of the blades 102 capture and remove portions of soil for forming post holes in the ground.

To facilitate driving of the blades 102 into the ground, the shaft portions 121 of each half 106, 108 include a base 104 and a handle 116 movably (e.g., slidably) coupled with the base. The description will proceed with reference to one shaft portion 121, but it is to be understood that the features of the shaft portion described herein are equally applicable to the other shaft portion of the digger 100. In the embodiment illustrated in FIGS. 1 and 2, the base 104 is a generally hollow cylindrically-shaped tube defining an interior channel 105. The interior channel 105 is sized and shaped to retain the handle 104 in substantial axial alignment with the base 104, but allow the handle to be moved translationally and rotationally within the channel. Accordingly, the interior dimensions of the base 104 defining the channel 105 should be just larger than the exterior dimensions of the handle 104. As illustrated, the interior channel 105 is substantially cylindrically shaped with a circular cross-section, and the handle 104 is also substantially cylindrically shaped with a circular cross-section just smaller than that of the interior channel. The handle 104 can be hollow or solid.

The base 104 and handle 116 are elongate with each having a length significantly greater than a width or diameter. The respective lengths of the base 104 and handle 116 can be selected to achieve a desired overall length of the shaft portion 121 in different configurations of the shaft portion. For example, in a retracted configuration (i.e., when the handle 116 is fully retracted into the base 104 (see, e.g., FIG. 1)), the lengths of the base 104 and handle 116 are selected such that the overall length of the shaft portion 121, which in the retracted configuration is a minimum length of the shaft portion, is a desired length. Similarly, in an extended configuration (i.e., when the handle 116 is fully extended from the base 104 (see, e.g., FIG. 3A), the lengths of the base 104 and handle 116 are selected such that the overall length of the shaft portion 121, which in the extended configuration is a maximum length of the shaft portion, is a desired length. The desired minimum and maximum overall lengths should be selected to be conducive to use by a probable user of the digger 100. In one implementation, the overall length of the shaft portion 121 is extendable from a minimum length of about 40 inches to a maximum length of about 70 inches.

Additionally, the overall lengths of the shaft portion 121 (particularly the maximum length) are dependent upon the configuration of an alignment slot 130 formed in the base 104. Generally, the alignment slot 130 engages a pin 134 of the handle 116. The slot 130 is wide enough to accept the pin 134 therethrough, but narrow enough to prevent substantial movement of the pin across a width of the slot. An upper end of the slot 130 effectively acts as a stop for restricting further translational movement or extension of the pin 134, and thus the handle 116, relative to the base 104. The upper end of the slot 130 can also be used as an impact receiver to transfer upwardly directed forces from the handle (e.g., pin of the handle) to the blades via the base. Such functionality allows a user to upwardly drive the movable handles into the base to dislodge or remove blades lodged or otherwise stuck in the ground.

The slot 130 includes three sections 131, 133, 135 collectively defining a substantially J-shaped or U-shaped slot. The first section 131 is a long longitudinally extending section of the slot 130. The long longitudinally extending section 131 extends substantially parallel to a central axis of the base 104 from an upper end 170 to a lower end 172. Generally, the first section 131 of the slot 130 engages the pin 134 and keeps the pin, and thus the handle 116, in a single rotational orientation (i.e., prevents rotation of the handle relative to the base) as the handle moves translationally within the base as indicated by directional arrows 150. The upper end 170 is spaced apart from an upper end 180 of the base 104 and defines a maximum limit of the range of motion of the handle 116 relative to the base as discussed above. The lower end 172 is similarly spaced apart from a lower end 182 of the base 104. However, the lower end 172 does not define the minimum limit of the range of motion of the handle 116. Rather, the minimum limit of the range of motion of the handle 116 is defined by a striking surface or plate 142 at the approximate lower end 182 of the base 104. The position or offset of the lower end 172 of the slot 130 relative to the lower end 182 of the base 104 is selected such that when the handle 116 is in contact with the striking plate 142, the pin 134 of the handle is positioned at the lower end 172 of the slot in lateral alignment with the second laterally extending section 133 of the slot as shown in FIG. 2.

The second laterally extending section 133 of the slot 130 extends partially across a circumference of the base 104. The third section 135 is a short longitudinally extending section that extends substantially parallel to the central axis of the base 104 like the long longitudinally extending section 131. However, the short section 135 of the slot 130 extends upward from the second section 133 of the slot a substantially shorter distance than the third section 131. Generally, the second and third sections 133, 135 of the slot 130 facilitate a temporary locking of the handle 116 relative to the base 104. However, in some implementations, the slot 130 only includes the first and second sections 131, 133 to collectively define a substantially L-shaped slot. In such implementations, only the second section 133 facilitates the temporary locking of the handle 116.

Figure 2:
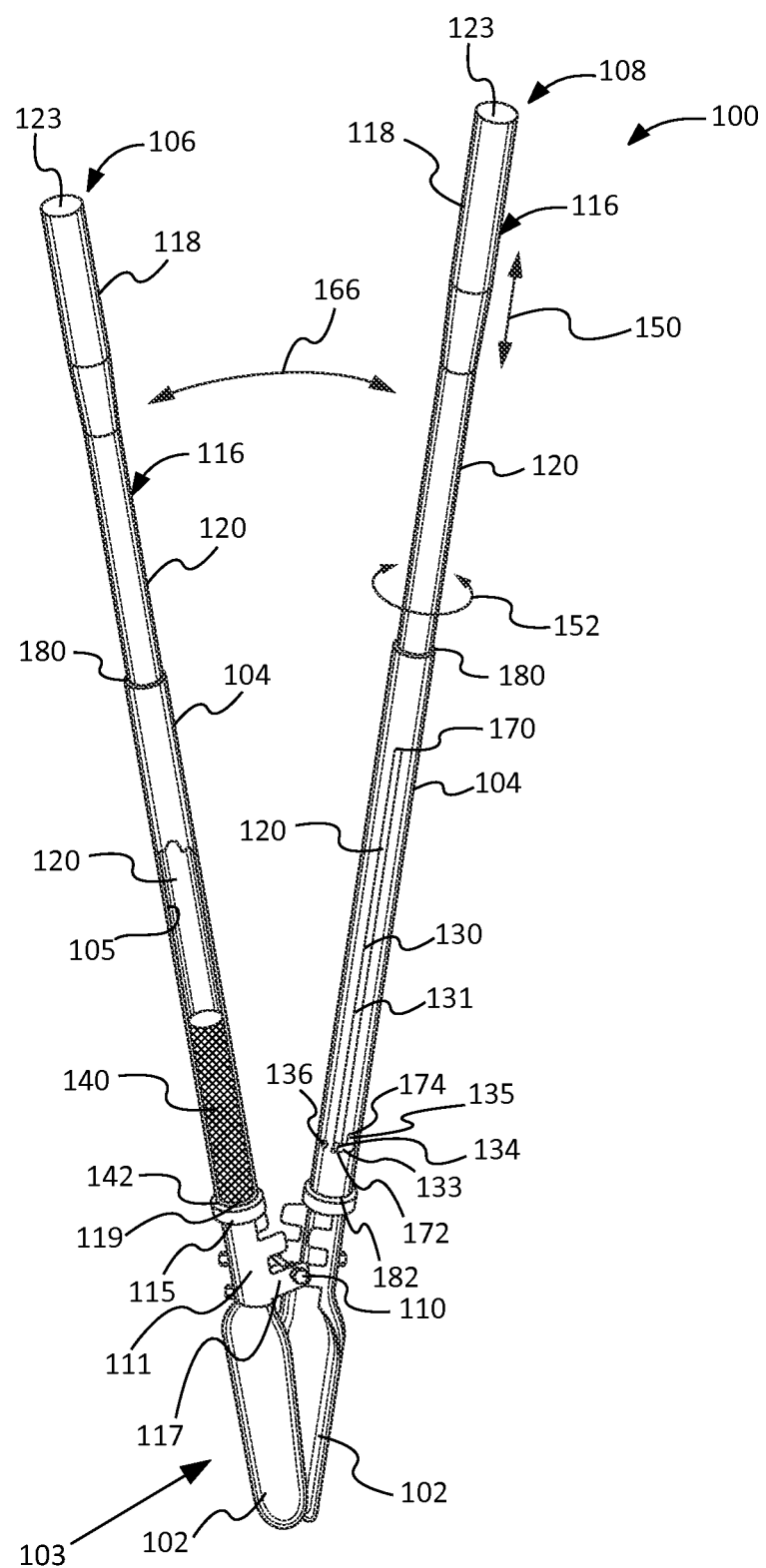
FIG. 2 is a side perspective view of a post hole digger in a closed configuration according to one embodiment.

With the handle 116 in contact with, or close to contacting, the striking plate 142, the handle 116 can be rotated in a counterclockwise direction as indicated by directional arrows 152 in FIG. 2 to move the pin 134 along the second section 133 of the slot 130. For L-shaped slots, with the pin 134 engaged with the second section 133, the second section prevents longitudinal movement of the handle relative to the base, and thus provides a type of temporary locking of the handle relative to the base. In contrast, for U-shaped or J-shaped slots, after moving the pin 134 along the second section 133, the pin in longitudinal alignment with the third section 135 of the slot. In this position, the handle 116 can be partially extended (e.g., moved upwardly as indicated by directional arrows 150) to move the pin 134 upward along the third section until an upper end 174 of the third section prevents further upwardly translational movement of the handle relative to the base 104. In such a position, the handle 116 is placed in a temporarily locked position in preparation of lifting the digger 100 to remove soil captured by the blades 102 as will be explained later in more detail.

Of course, the handle 116 can be taken out of the temporarily locked position by lowering the handle and pin 134, and rotating the handle and pin in a clockwise direction as indicated by directional arrows 152 until the pin is in vertical or longitudinal alignment with the first section 131 of the slot 130. The direction of rotation need not necessarily be counterclockwise to lock the handle and clockwise to unlock the handle. For example, the directions could be reversed if the second and third sections of the slot 130 extended away from the first section in a direction opposite the direction shown, or if the user was positioned on an opposite side of the digger 100 during use. It is also noted that the direction of rotation of a handle to lock and unlock the handle may be different (e.g., opposite) for each of the two handles (e.g., right and left handles). For example, while one handle (e.g., a right handle) is rotated counterclockwise to lock the handle, the other handle (e.g., left handle) is rotated clockwise to lock the handle. Alternatively, the slots of the respective right and left handles may be configured differently, such that both the right and left handles are rotated in the same direction to lock and unlock the handles.

Generally, the pin is coupled to a main shaft portion 120 of the handle 116 and extends radially outwardly from the main shaft portion 120 to engage the slot 130. In some embodiments, the pin 134 is retractable into the main shaft portion 120. The pin 134 can be coupled to a biasing element (e.g., a spring) that biases the pin in the extended position. The pin 134 is then retracted into the main shaft portion 120 by overcoming the bias of the biasing element (e.g., pushing the pin into the main shaft portion). From the retracted position, once the pin 134 is released, the bias of the biasing element forces the pin radially outwardly into the extended position.

In the illustrated embodiment, the base 104 includes an aperture 136 formed in the base. The aperture 136 is sized and shaped to receive and retain the pin 134 therein. Preferably, the aperture 136 is sized and shaped to matingly engage the pin 134 such that the pin 134, and thus the handle 116, is substantially prevented from translational and rotational movement relative to the base 104. In the illustrated implementation, the aperture 136 can be positioned adjacent the transversely extending section 133 of the slot 130 proximate the lower end 182 of the base 104. From a position engaged with the slot 130, the pin 134 can be depressed or retracted and the handle 116 can be rotated in the clockwise direction as indicated by directional arrows 152 until the pin is aligned with the aperture 136. Once aligned, the bias of the pin 134 forces the pin 134 outwardly through the aperture 136 to engage the aperture 136 and place the handle 116 in a more permanent locked position, such as when transportation or storage of the digger 100 is desired.

Although in the illustrated embodiments, the digger 100 includes two halves pivotally coupled to each other by a pivot connection, in other embodiments, the tool described herein may only include a single half. For example, the tool can be a manual jack-hammer tool with a single handle, base, and blade. The handle can be slidably coupled to the base as described above. Moreover, movement of the handle along the base can be guided through engagement between a pin and alignment slot as described above and temporary and/or more permanent locking of the handle relative to the base for lifting/storing the entire tool can be facilitated by the pin and slot engagement as also described above. The blade can be any of various blades or tool attachments, such as a shovel, a spade, an edger, a hoe, a pitchfork, a plow, and the like.

As shown in a cut-away of the base 104 in FIG. 2, a lower section of the main shaft portion 120 of the handle 116 can include a weight 140. The weight 140 can be positioned at any longitudinal location along the handle 116. However, in certain implementations, the weight 140 is preferably located at or proximate a lower end 119 of the handle, which defines a striking surface of the handle. Accordingly, the striking surface or lower end 119 of the handle 116 can be defined by the weight 140. Generally, the end or striking surface 119 is substantially flat and the striking surface or plate 142 of the base 104 also is substantially flat to uniformly distribute the striking force from the handle 116 to the base 104 across a large area. In some implementations, the weight 140 is a solid portion of an otherwise hollow main shaft portion 120. In other implementations having a solid main shaft portion 120, the weight 140 is made from a material heavier or denser than the remainder of the main shaft portion. The weight 140 can be formed together (e.g., integrally or monolithically) with the main shaft portion 120 or the weight can be an insert positioned within a hollow main shaft portion.

The handle 116 also includes a grip portion 118 proximate an upper end 123 of the handle. The grip portion 118 may include a friction-enhancing and/or padded sleeve enveloping an upper end of the main shaft portion 120. In other implementations, the grip portion 118 may include a grip-enhancing coating applied to the upper end of the main shaft portion. The grip portion 118 is configured to accommodate the grip of a user for operation of the digger 100. As shown, the main shaft portion 120 can extend continuously from the lower end 119 up to the upper end 123 of the handle 116. Alternatively, the main shaft portion 120 may terminate at the grip portion 118, with the grip portion attached to the shaft portion.

In one embodiment, both the base 104 and handle 116 are formed of metal or metal alloy materials. For example, the base 104 and handle 116 may be formed of an aluminum alloy. Alternatively, the base 104 and sleeve 116 may be formed of composite materials. In a further embodiment, the handle 116, or at least the weight 140 of the handle, may be formed of a heavier material so that the driving force applied to the blades is greater. One example of a heavier material includes, but is not limited to, iron.

The pivot connection 103 includes a pivot fastener 110 that pivotally couples together corresponding brackets 111. The brackets 111 each include opposing apertures through which the pivot fastener 110 extends to pivotally couple the brackets and allow the brackets to pivot about the fastener. In the illustrated embodiments, the brackets 111 each include opposing plates 117 in which the apertures are formed. The plates 117 are secured to respective base receivers 115 configured to receive and secure the bases 104. Distal portions of the plates 117 are designed (e.g., angled) to contact each other when the digger 100 is positioned into the open and closed configurations, respectively. Accordingly, the plates 117 act as stops to prevent actuation of the handles beyond the open and closed configurations. In this manner, the handles 116 are prevented from contacting each other in the open configuration, which also prevents pinching hazards during use. The plates can be secured to the receivers 115 via any of various techniques, such as fastening and welding. Similarly, the bases 104 can be secured to the receivers 115 via any of various techniques, such as fastening and welding.

The blades 102 each have a relatively sharp or pointed distal end (e.g., leading edge) for penetrating the ground. The distal end may be substantially rounded. Each blade may be curved or cupped to form a substantially semi-circular-shaped cross-section. Accordingly, when the blades 102 are relatively close together in the closed configuration, the blades define a substantially cylindrically-shaped space for capturing soil. When the blades are apart, the blades define a substantially oblong cylindrically-shaped space. In one implementation, the blades 102 are movable between the open and closed configurations in a clamshell-like movement. The pivot connection 103 and blades 102 can be made from any of various materials, such as metals, metal alloys, composites, hard plastics, and the like. In one implementation, the blades 102 are formed separately from and attached (e.g., via welding or fastening) to respective halves of the pivot connection 103. In another implementation, the blades 102 are formed integrally as one-piece monolithic construction with the respective halves of the pivot connection 103.

In some embodiments, the pivot connection 103 may facilitate removably coupling of the blades such that the blades can be interchangeable with the same type of blades (e.g., to replace worn out blades) or other types of blades (e.g., to accommodate different applications). Additionally, in certain embodiments, the pivot fastener of the pivot connection 110 may be easily removable to disengage one half of the pivot connection with the other half. In this manner, a user can easily convert between the digger 100 with dual handles and pivoting blades to a tool with a single handle and a single blade (or other tool attachment) as discussed above.

Figure 3A:
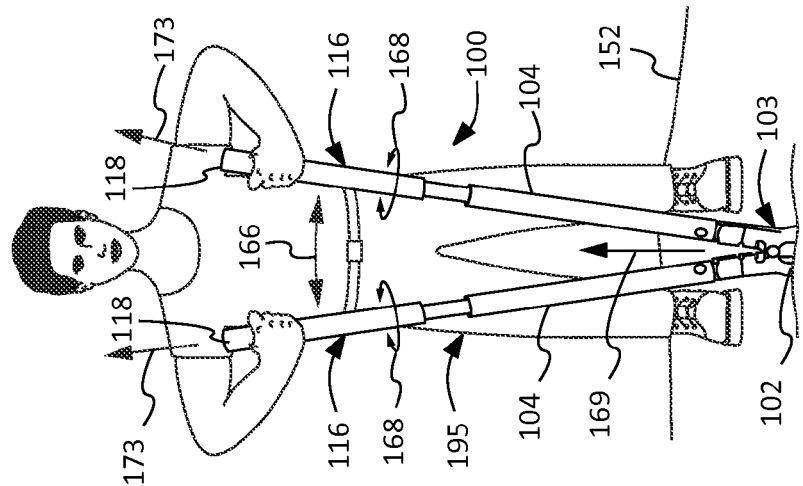
FIG. 3A is a front view of a post hole digger being used in a post hole forming operation according to one embodiment with the digger in an open configuration and handles raised.
Figure 3B:
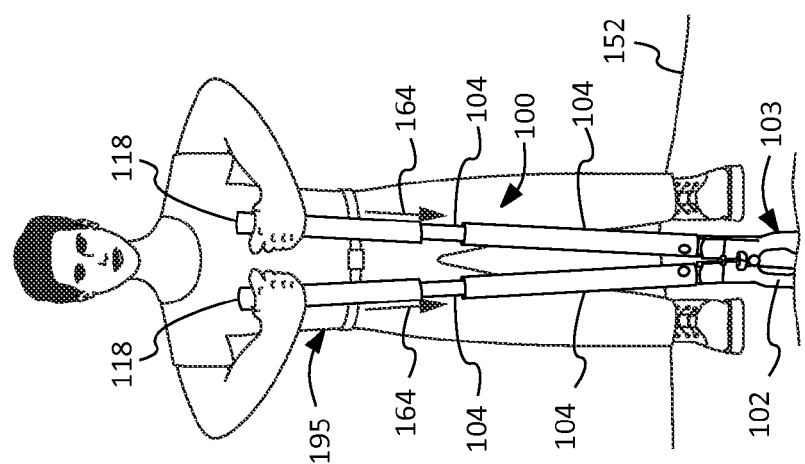
FIG. 3B is a front view of a post hole digger being used in a post hole forming operation according to one embodiment with the digger in an open configuration and handles lowered.
Figure 3C:
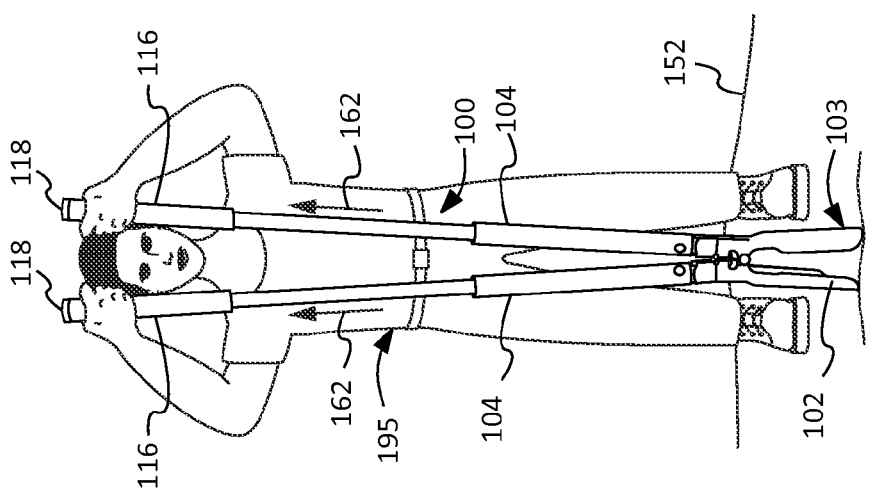
FIG. 3C is a front view of a post hole digger being used in a post hole forming operation according to one embodiment with the digger in a closed configuration and handles lowered and temporarily locked in place.

The post hole digger 100 is used for digging relatively narrow holes for installing posts, such as fence posts, sign posts, and the like. Referring to FIGS. 3A-3C, a method for digging post holes using the digger 100 is pictorially illustrated. Initially, as shown in FIG. 3A, the digger 100 is placed onto the ground 152 over an installation site while in an open configuration. In the open configuration, the bases 104 and handles 116 of the digger 100 are positioned relatively close to each other, which corresponds to the blades 102 being relatively far apart from each other. With a user 195 grasping the grip portions 118 of the handles 116 with respective hands, the handles are raised relative to the bases 104 and blades 102 by the user as indicated by direction arrows 162 into a raised position as depicted in FIG. 3A. Because the handles 116 are not directly coupled to each other, the raising of each handle 116 is performed independently of the other handle 116. Further, due to the engagement of the pins of the handles 116 with the long longitudinal sections of the slots 130 as the handles are raised, the handles 116 do not rotate as they are raised.

From the raised position, and with the digger 100 remaining in the open configuration, the user 195 grasping the grip portions 118 as discussed above, the user forcefully drives the handles 116 downwardly as indicated by directional arrows 164 until the lower end of the handles (e.g., striking surfaces of the handles) impact the lower ends of the bases (e.g., striking surfaces of the bases) to position the handles in a lowered position. The downwardly directed momentum of the handles 116 generated by the user 195 is transferred to the blades 102 via the pivot connection 103 by virtue of the impact between the handles and bases. In some implementations, because the blades 102 are formed integrally as a one-piece monolithic construction with the pivot connection 103, the impact force is transferred directly from the handles 116 to the blades. The downwardly directed impact force drives the blades 102 a certain depth into the ground at the installation site. The depth is dependent upon several factors, such as, for example, the force generated by the user, the conditions of the soil, the sharpness of the blades, etc.

In operation, the post hole digger 100 drives the blades 102 into the ground to a desired depth associated with the depth of the post hole. Often, a single impact from the handles 116, although enough to drive the blades 102 deeper into the ground, is not enough to achieve the desired depth. Accordingly, the operations of raising the handles 116 into the raised position discussed above in relation to FIG. 3A, and downwardly driving the handles into contact with the bases and into the lowered position, are repeated as necessary to incrementally drive the blades to the desired depth in the ground.

When the desired depth is reached, the handles 116 and bases 104 are moved apart from each other as indicated by directional arrows 166 to place the digger 100 in a closed position by the user grasping and pulling apart the grip portions 118 as shown in FIG. 3C. In the closed configuration, the bases 104 and handles 116 are positioned apart from each other, which corresponds to the blades 102 being positioned relatively close to each other. More specifically, as the handles 116 are pulled apart, the blades 102 are drawn together to capture (e.g., compress and retain) a portion of the soil therebetween. Before or after actuating the digger 100 (e.g., blades 102) into the closed configuration, with the handles 116 in the lowered position, the handles 116 are rotated as indicated by directional arrows 168 and slightly lifted as indicated by directional arrows 173 to move the pins 134 along the slots 130 into the temporarily locking position as discussed above. When temporarily locked, the handles 116 are prevented from being raised or lifted relative to the bases 104. After capturing the portion of soil by actuating the digger 100 into the closed position, and with the handles 116 temporarily locked (or alternatively partially permanently locked as discussed above), the entire digger is lifted by the user as indicated by directional arrow 169 while maintaining the digger in the closed position. Once the digger 100 is cleared of the post hole just formed in the ground by virtue of the removal of the portion of soil within the blades 102, the digger 100 can be moved away from the hole and actuated into the open position to release the soil captured by the blades. The method associated with FIGS. 3A-3C can be repeated to form a plurality of post holes in the ground 152 as desired.

With conventional post hole diggers, a user would be required to repeatedly lift the entire digger up and drive the blades of the digger into the ground. Because the blades would be lifted off of the ground and driven back into contact with the ground, due to inconsistencies associated with manually operation, the blades likely would not contact the same location twice, which lead to imprecise post holes and inaccurate locations within the ground. In direct contrast to conventional post hole diggers, the digger 100 forms the post holes without the blades losing contact with the ground. Accordingly, the post holes formed by the digger 100 are more precise and accurately positioned compared to holes formed by conventional diggers. Moreover, because the handles 116 weigh less than the entire digger 100, the energy exerted by a user to form a post hole is less than with conventional diggers that require the user to lift the entire digger to form the holes. In this manner, post holes are formed more efficiently with the post hole digger 100 than with conventional diggers.

Figure 4:
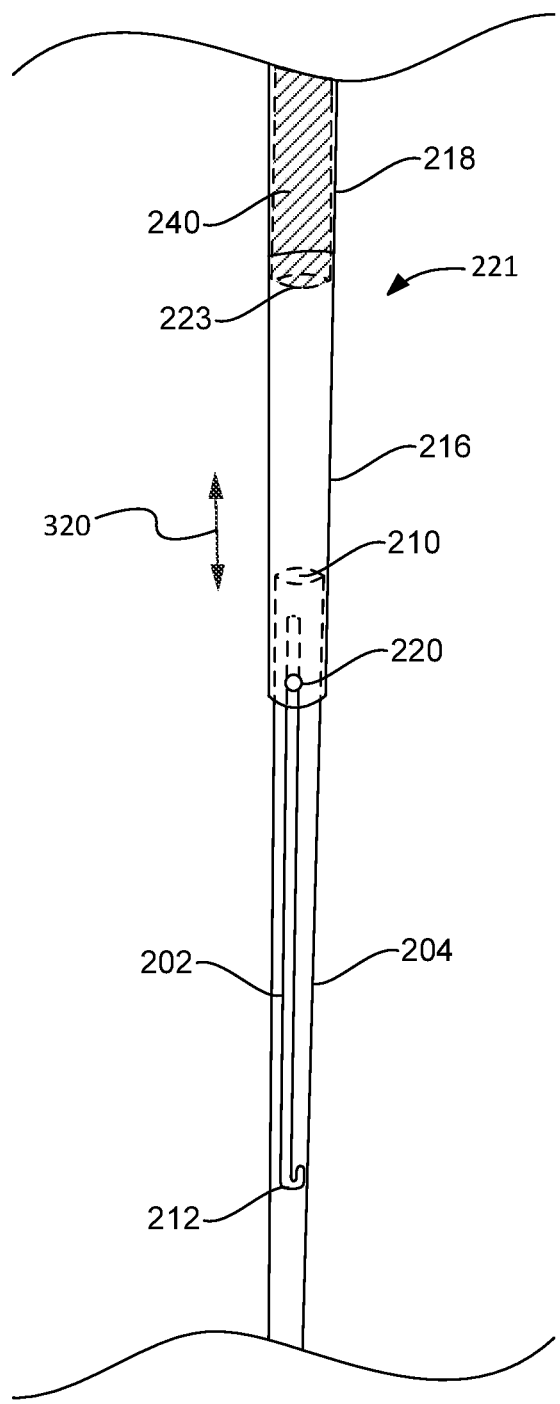
FIG. 4 is a side perspective view of a shaft portion of a post hole digger according to another embodiment.
Figure 5:
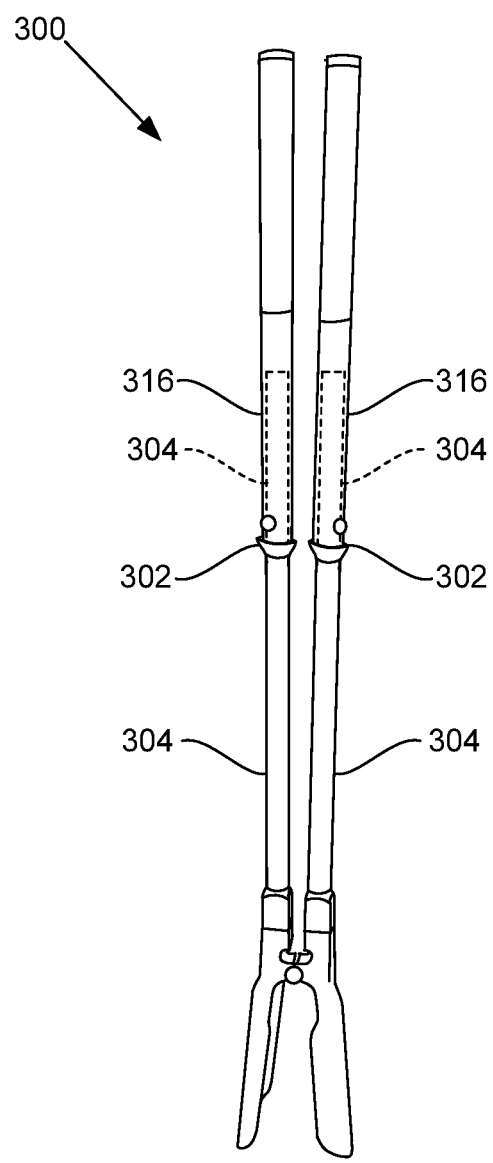
FIG. 5 is a front perspective view of a post hole digger according to yet another embodiment.
Figure 6:
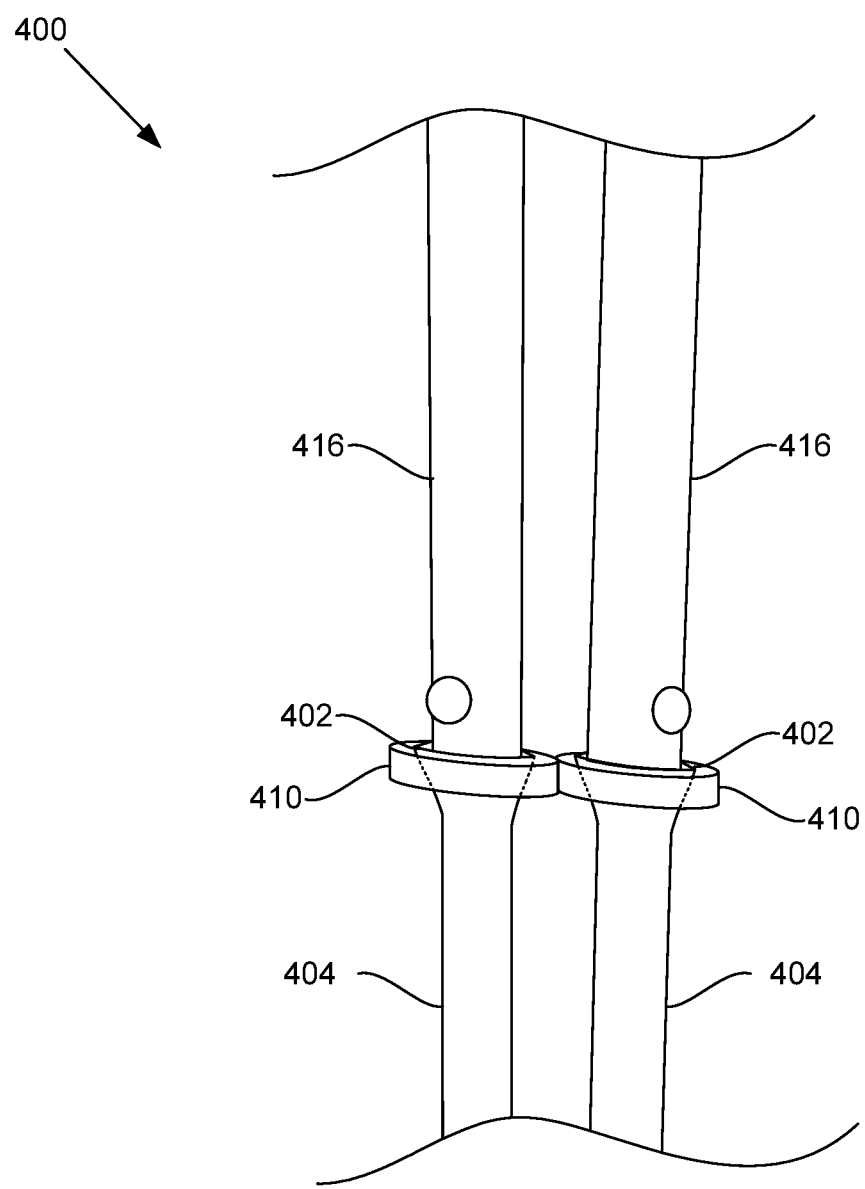
FIG. 6 is a side perspective view of a shaft portion of a post hole digger according to another embodiment.

Although in the above-described embodiments, the shaft portions 121 each include a handle that is insertable into and movable within a base, in other embodiments, the shaft portions may be reversed such that the base is insertable into and movable within the handle. For example, as shown in FIGS. 4-6, the shaft portion 221 includes a sliding handle 216 that slides over a base 204, and is longitudinally or translationally movable along the base between raised and lowered positions as indicated by directional arrows 320. In other words, the handle 216 includes an interior channel within which the base 204 is slidable. The handle 216 includes a guide pin 220 which passes through a guide slot 202 formed in the base 204. Engagement between the guide pin 220 and slot 202 prevents relative rotation between the handle and base. However, to facilitate a temporary locking of the handle relative to the base, the slot 202 may include a substantially J-shaped section 212.

The handle 216 also includes a weight 240 proximate an upper end of the handle (e.g., adjacent a grip portion 218 of the handle). The weight 240 includes a striking surface 223 that impacts an upper end 210 of the base 204 as the handle 216 is driven downwardly relative to the base. The impact between the weight 240 and upper end 210 of the base 204 indirectly transfers the momentum from the downwardly moving handle 216 to blades via the base.

In other embodiments with a pin and slot configuration, the guide pin locks the longitudinal movement of the handle in any position between the raised and lowered positions. For example, the guide pin may be implemented as a screw that, when twisted, causes the handle to compress around the base and thereby impede longitudinal movement of the handle relative to the base.

In alternative embodiments of the post hole digger described herein, the pin and slot configuration for preventing rotational movement between the handle and base may be replaced with a spline and corresponding channel. In an alternative embodiment, each handle and base may have a polygonal, or other non-round, cross-section for maintaining the rotational position of the handle with reference to the base. In yet some embodiments, rotational movement between the handle and base is permitted as the handle is moved longitudinally relative to the base. In such embodiments, configurations other than a retractable pin and slot/aperture for temporarily or more permanently locking the handle relative to the base for removing soil or for storage, respectively, may be used.

According to another embodiment incorporating some features from the shaft portion 221 of FIG. 4, the post hole digger 300 of FIG. 5 includes strike plates 302 that are external to the base 304 to receive impacts from the handle 316. In other words, instead of impacting an upper end of the base with a striking surface of an internal weight as with the shaft portion 221, the post hole digger 300 impacts the striking plate 302 with a bottom end of the handle 316. The strike plates 302 receive the striking force from the handles 116 and transfer the force to the blades of the digger 300. The use of strike plates 302 in this manner beneficially spreads the striking force across a greater surface area and reduces deformation that may occur to the guide pin, guide slot, or upper end of the base 304. The strike plate 302 may integrally formed with the base 302, or may be attached to the exterior of the base.

In the depicted embodiment, the strike plates 302 are positioned near the top of the bases 304. However, in an alternative embodiment, the strike plates 302 may be positioned near the bottom of the bases 304. Handles 316 having a length sufficient to extend the entire length of the base 304 may be utilized to deliver the impact strike to the strike plates 302 positioned near the blades. As described previously, this beneficially transfers the impact strike directly to the blades. In such embodiments, weights may be secured to the external surface of the handles 316 near the lower end of the handles, and a portion of the weights may actually impact the strike plates if desired.

According to one embodiment shown in FIG. 6, a post hole digger 400 includes bump stops 410 to prevent a user from pinching their hands while using the digger. The bump stops 410 may be formed of a flexible, elastomeric, and/or rubber material. The bump stops 410 may be positioned, as depicted, on strike plates 402. Alternatively, the bump stops 410 may be positioned at the top of, or anywhere on, the handles 416 in one implementation and/or on the bases 404 in other implementations. Further, the use of bump stops 410 is not limited to embodiments having external strike plates, such as strike plates 302, but bump stops can be used on any of the various post hole digger embodiments described herein to prevent pinching during use.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

The subject matter of the present disclosure may be embodied in other specific forms without departing from its spirit or essential characteristics. The described embodiments are to be considered in all respects only as illustrative and not restrictive. The scope of the subject matter of the present disclosure is, therefore, indicated by the appended claims rather than by the foregoing description. All changes which come within the meaning and range of equivalency of the claims are to be embraced within their scope.

What is claimed is:

1. A method for forming a post hole in the ground, comprising:
    positioning a post hole digger over a post installation site on the ground, the post hole digger comprising a pair of shaft portions each comprising a handle slidably coupled to a base, wherein the post hole digger further comprises a pair of blades each coupled to the base of a respective one of the shaft portions;

independently sliding the handles along the bases from a raised position downwardly toward the ground into a lowered position to impact an impact plate of the post hole digger in force transmitting communication with the blades to drive the blades into the ground;

independently sliding the handles along the bases upwardly from the lowered position into the raised position; and temporarily locking each handle in place relative to a respective base, wherein temporarily locking each handle in place relative to the respective base consists of independently rotating each handle relative to the respective base and independently lifting each handle relative to the respective base.

2. The method of claim 1, wherein:

independently sliding the handles along the bases from the raised position downwardly toward the ground into the lowered position and independently sliding the handles along the bases upwardly from the lowered position into the raised position comprises guiding respective pins of the handles along respective alignment slots formed in the bases; and rotating the handles relative to the respective bases to temporarily lock the handles in place comprises guiding the respective pins of the handles along respective U-shaped portions of the alignment slots.

3. The method of claim 2, further comprising retracting the pins out of the alignment slots, rotating the handles relative to the bases, and extending the pins into engagement with respective apertures formed in the bases to more permanently lock the handles in place.

4. A hand tool, comprising:

a base comprising a first impact surface and a slot, the slot comprising two parallel tracks coupled together by an intermediate track extending substantially perpendicular to the two parallel tracks;

a handle slidably coupled to the base, the handle comprising a second impact surface, the handle being slidable relative to the base such that the second impact surface of the handle impacts the first impact surface of the base, wherein the handle further comprises a pin engageable with the slot of the base, the pin being movably retained by the slot as the handle slides relative to the base; and a tool attachment coupled to the base.

* * * * *